United States Patent [19]

Reudink

[11] Patent Number: 4,498,173
[45] Date of Patent: Feb. 5, 1985

[54] TECHNIQUE FOR DIGITAL SPLIT-CHANNEL TRANSMISSION USING INTERPOLATIVE CODERS AND DECODERS

[75] Inventor: Douglas O. Reudink, Sea Girt, N.J.

[73] Assignee: AT&T Bell Laboratories, Murray Hill, N.J.

[21] Appl. No.: 389,448

[22] Filed: Jun. 17, 1982

[51] Int. Cl.³ .............................................. H04B 7/06
[52] U.S. Cl. .......................................... 371/30; 371/8; 375/38
[58] Field of Search .................. 371/30, 8, 68; 381/29, 381/30, 31, 34, 35; 340/347 AD; 375/38, 40; 455/59

[56] References Cited

U.S. PATENT DOCUMENTS

| | | | |
|---|---|---|---|
| 4,020,461 | 4/1977 | Adams et al. | 371/37 |
| 4,202,011 | 5/1980 | Koga | 358/136 |
| 4,229,822 | 10/1980 | Bench | 375/81 |
| 4,267,407 | 5/1981 | Schindler et al. | 381/30 |
| 4,280,222 | 7/1981 | Flower | 375/38 |
| 4,286,334 | 8/1981 | Gammel et al. | 375/40 |
| 4,313,194 | 1/1982 | Maitre et al. | 370/69 |
| 4,397,036 | 8/1983 | Hirade et al. | 375/40 |

OTHER PUBLICATIONS

R. S. Cheung et al., The Design of a 16 Kb/s Split-Band Adaptive Predictive Coder for Noisy Channels, ICASSP 81, vol. 1, Mar. 1981, pp. 631–635.

Primary Examiner—Charles E. Atkinson
Attorney, Agent, or Firm—Erwin W. Pfeifle

[57] ABSTRACT

The present invention relates to a technique using interpolative coders and decoders to permit an analog input message signal to be sampled at the Nyquist rate, each sample is then encoded into a corresponding level of an X-bit code and the encoded corresponding level is then encoded into a unique corresponding digital number pair. Each digital number pair includes two separate digital signals comprising Y bits each for transmission over two separate channels or paths to a remote receiver for inverse decoding. In accordance with the present technique either half of the transmitted signal can be used to reproduce the original signal to a fair degree of accuracy and both halves can provide high-quality reproduction of the original signal.

11 Claims, 7 Drawing Figures

FIG. 3

| SAMPLE VOLTAGE LEVEL | 5×2^M QUANTIZED LEVELS | 1st NUMBER OF A NO. PAIR CODE | 2nd NUMBER OF A NO. PAIR CODE | OUTPUT NUMBER OF A CONVENTIONAL M-BIT CODER |
|---|---|---|---|---|
| | 20 | j+4 | j+3 | |
| | 19 | j+3 | j+4 | |
| | 18 | j+2 | j+4 | |
| | 17 | j+3 | j+3 | j+3 |
| | 16 | j+4 | j+2 | |
| | 15 | j+3 | j+2 | |
| | 14 | j+2 | j+3 | |
| | 13 | j+1 | j+3 | |
| | 12 | j+2 | j+2 | j+2 |
| | 11 | j+3 | j+1 | |
| | 10 | j+2 | j+1 | |
| | 9 | j+1 | j+2 | |
| | 8 | j | j+2 | |
| | 7 | j+1 | j+1 | j+1 |
| | 6 | j+2 | j | |
| | 5 | j+1 | j | |
| | 4 | j | j+1 | |
| | 3 | j−1 | j+1 | |
| | 2 | j | j | j |
| | 1 | j+1 | j−1 | |
| | 0 | j | j−1 | |

FIG. 7

| | 1st NO. K·LEVELS | 2nd NO. K LEVELS | COMBINED 3K LEVELS |
|---|---|---|---|
| (j+2)th LEVEL | — | — | (j+2, j+2) <br> (j+2, $\overline{j+2}$) |
| (j+1)th LEVEL | — | — | ($\overline{j+1}$, j+1) <br> (j+1, j+1) <br> (j+1, $\overline{j+1}$) |
| (j)th LEVEL | — | — | ($\overline{j}$, j) <br> (j, j) <br> (j, $\overline{j}$) |
| (j−1)th LEVEL | — | — | ($\overline{j-1}$, j−1) <br> (j−1, j−1) <br> (j−1, $\overline{j-1}$) |
| (j−2)th LEVEL | — | — | ($\overline{j-2}$, j−2) <br> (j−2, j−2) |

TECHNIQUE FOR DIGITAL SPLIT-CHANNEL TRANSMISSION USING INTERPOLATIVE CODERS AND DECODERS

BACKGROUND OF THE INVENTION

1. Field of the Invention

The present invention relates to a technique for digital split-channel transmission and, more particularly, to a technique using interpolative coders which convert samples of an analog signal into unique digital number pairs for separate transmission to a remote receiver for inverse decoding. Such technique permits either half of the transmitted signal to be used to reproduce to a fair degree of accuracy, and both halves of the transmitted signal to provide high-quality reproduction of, the original analog signal.

2. Description of the Prior Art

Reliability in the transmission and reception of voice signals over signal paths which are subject to frequent outages, as might be found, for example, in mobile telephony, is important. Prior art techniques for increasing reliability of the recovered signal include the use of error correcting codes and multiple transmission of the signal.

Another technique is disclosed in U.S. Pat. No. 4,229,822 issued to S. M. Bench on Oct. 21, 1980. There, information is encoded into digital messages having a start code followed by one or more data blocks. The start code identifies the beginning of the data block that follows and enables synchronization of clock circuitry to the received data frequency. The data blocks have N digital words with M binary bits where one word is a parity word and N−1 words are data words. Each of the data words has a data portion and parity portion coded for correction of at least one error. Reliability is enhanced by a data detector which discriminates between data and noise or voice to provide an indication of the presence of data. In transmitting the digital messages, the bits of the N words in each data block are interleaved to provide protection against error bursts.

Another technique is disclosed in the article "The Design of A 16 Kb/s Split-Band Adaptive Predictive Coder For Noisy Channels" by R. S. Cheung et al. in *ICASSP 81 Proceedings*, Altanta, Ga. Mar. 30–Apr. 1, 1981, at pages 631–635. There, the frequency contents of an input signal are evenly split into two subbands via quadrature mirror filters and, after sampling at the Nyquist rate, adaptive predictive coding (APC) is applied to the subband waveform samples. A bit allocation scheme is used to dynamically alter the quantizer bit assignment according to the energies of the two subbands. At the receiver the digital subband signals are decoded using APC and the difference between the two decoded signals forms an estimate of the original signal.

The problem remaining in the prior art is to provide a technique which is easy to implement which can provide high quality reproduction of the original signal with all parts of the signal being received and a fair degree of accuracy when only a part of the signal is received.

SUMMARY OF THE INVENTION

The foregoing problem has been solved in accordance with the present invention which relates to a technique for digital split-channel transmission and, more particularly, to a technique using interpolative coders which convert samples of an analog signal into unique digital number pairs for separate transmission to a remote receiver for inverse decoding. Such technique permits either half of the transmitted signal to be used to reproduce to a fair degree of accuracy, and both halves of transmitted signals to provide high-quality reproduction of, the original analog signal.

It is an aspect of the present invention to provide a technique for split-channel transmission wherein an analog input signal is sampled at a predetermined rate, the samples are each encoded into a corresponding level of an X-bit code and the code level is then translated into a unique corresponding digital number pair including two digital signals of Y-bits each, where $Y<X$, for transmission over separate channels or paths. Decoding at the receiver is inversely performed.

Other and further aspects of the present invention will become apparent during the course of the following description and by reference to the accompanying drawings.

BRIEF DESCRIPTION OF THE DRAWINGS

Referring now to the drawings, in which like numerals represent like parts in the several views:

FIG. 3 is a table showing the first 20 levels possible for a $5 \times 2^M$ coder in accordance with the present invention;

FIG. 7 is a table showing a coding technique for split channel use in accordance with the present invention with 3K-levels of resolution using two K-level numbers for the number pair codes.

DETAILED DESCRIPTION

Figure 1:
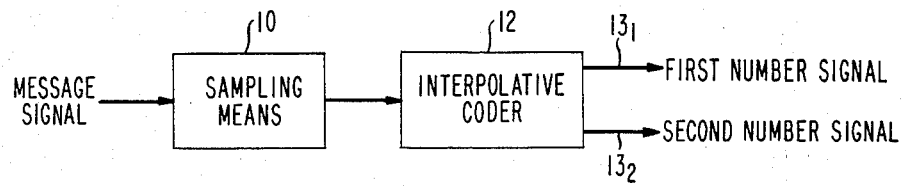
FIG. 1 is a block diagram of a coding arrangement in accordance with the present invention.

FIG. 1 illustrates a coding arrangement in accordance with the present invention, the coding arrangement comprising a sampling means 10 and an interpolative coder 12. In the coding arrangement of FIG. 1, an analog message signal is sampled at the Nyquist rate by a sampling means 10, and each of the generated sample signals is received by the interpolative coder 12 and converted into an equivalent number pair code. A first and a second number of the code pair is then transmitted over a first and a second channel or lead $13_1$ and $13_2$, respectively. Sampling arrangements are well known in the art and any suitable arrangement can be used for sampling means 10 which provides the samples described hereinabove. Coder 12 can comprise any suitable arrangement for converting the analog sample from sampling means 10 into a number pair code. A typical arrangement for coder 12 is shown in FIG. 2.

Figure 2:
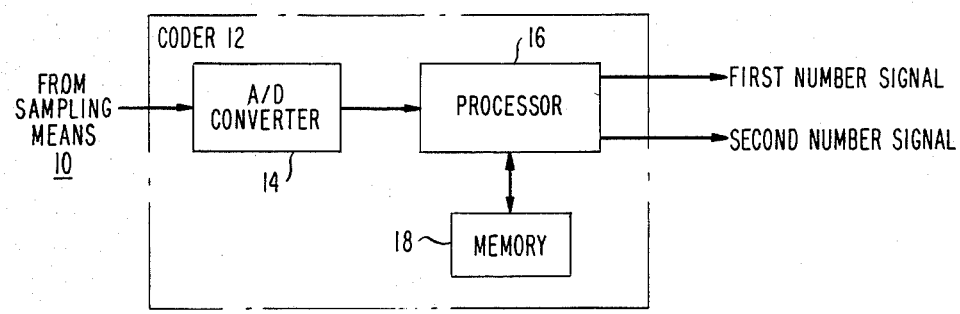
FIG. 2 is a block diagram of an arrangement for use as the interpolative coder of FIG. 1.

In the coder of FIG. 2, each sample of the analog message signal from sampling means 10 is converted by any suitable means such as, for example, an analog-to-digital converter 14 into an equivalent digital code signal. More particularly, A/D converter 14 can be linear or a non-linear converter which converts the magnitude of each sample into an equivalent digital signal of a $2^{2M}$ level code. The digital code signal from A/D converter 14 is then transformed by a processor 16 into representative digital number pair code (j,k), where each number of the pair comprises a predetermined fraction such as one-half (M) of the number of bits found in the digital code signal from A/D converter 14. Processor 16 can comprise any suitable arrangement for performing the function described hereinabove. One arrangement for processor 16 is a microprocessor which performs a table look-up using a memory 18 to transform the digital signal from A/D converter 4 into a number pair code for transmission on output channels or leads 13$_1$ and 13$_2$.

The coding of the signal can be thought of as using number pairs to represent a quantized version of the input signal and each number in the pair is sent over a different path. Consider for example a six bit signal split into two 3-bit words. There are 64 number pairs of the form (j,k) j=0,7 k=0,7 available to encode the signal. If the identical signal is sent on each channel, then only the number of pairs (j,j) j=0 to 7 are transmitted and the reconstructed signal has only 3 bits of resolution. In accordance with the present invention, the resolution is increased at a cost of decreasing the accuracy of the signal represented on the split channels or leads by using more number pairs than just (j,j). The Table in FIG. 3 illustrates how five times as many number pairs can be transmitted over the conventional (j,j) coder, yet with each split channel having some approximation to the original signal level.

In the Table of FIG. 3, it should be noted that the numbers in each of the five number pairs in each section associated with a particular value of j of the conventional coder have the same corresponding relationship or difference to the associated j value of the conventional coder as the numbers in each of the other sections. For example, each of the numbers of the bottom number pair (j,j−1), (j+1, j) and (j+2, j+1) of each of the bottom three sections when compared with the associated conventional coder code j, j+1 and j+2, respectively, produce a difference of (0, −1). Similarly, each of the numbers of the other corresponding number pairs in each of the sections also produce a predetermined difference with their associated conventional coder code. Each of the sections is produced by adding +1 to the corresponding number in the section immediately below the section under consideration.

Coder 12 functions as follows. For the 5-level code of FIG. 3, divide the input voltage range into ($5 \times 2^M - 6$) levels where M is the number of bits available for each of the split channels and the −6 arises because there are 3 number pairs at the ends of the ranges which cannot be used. For illustration let M=3 and assign the number pairs to these levels with the values j=0 to 7 in FIG. 3. For the 5 number pairs in the bottom section where j=0 it can be seen that only the middle and top number pair will produce two numbers which are within the range of 0-7, the other three number pairs having one number below 0. For the values j=1 to 6, each of the sections will provide 5 number pairs. However, for j=7 only the bottom and middle number pair will provide numbers within the range 0-7. Therefore, under normal circumstances only 34 levels of resolution are available to encode the signal; 2 levels for each of the bottom and top sections and 5 levels for each of the 6 intermediate levels.

Figure 4:
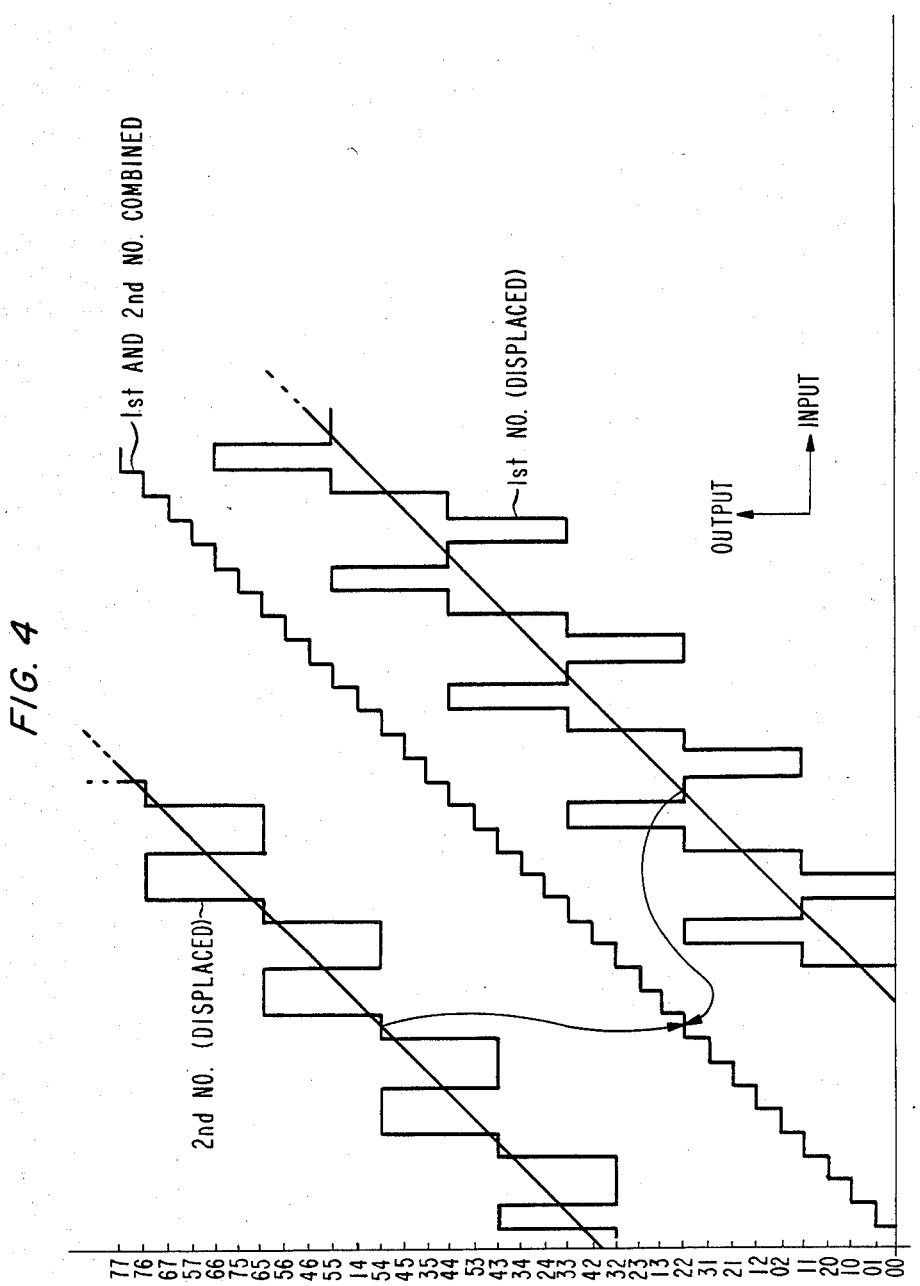
FIG. 4 is a graph of the input/output characteristics of a coder in both the normal mode and the split-channel mode.

In the arrangement of FIG. 1 using the coding Table of FIG. 3, if one of the channels is lost, a coarsely quantized version of the input signal having only 8 levels is obtained. As can be seen in FIG. 3, the value of j can occur plus or minus one level different from what a true M bit quantizer would output. For example, for a received value of j+2 in either the first or second number of a number pair, such value is found for the present coder 12 in the conventional coder section for j+2 and also in the conventional coder sections for j+1 and j+3. As a result there is an increase in quantizing noise. Thus, with the example of a two 3-bit code, a resolution of slightly over 5 bits is obtained. Using a total of eight transmitted bits provides 74 levels or approximately 6.2 bits of resolution for the normal signal and somewhat less than 4 bits of resolution when one of the channels is lost. FIG. 4 shows the input/output characteristics of a coder in both the normal mode and the split channel mode.

Although present coder 12 using the code of the Table of FIG. 3 may be considered inefficient because only 34 out of 64 possible pairs can be transmitted, the coder does afford a degree of error detection/correction. The reception of a forbidden number pair would immediately indicate a transmission error and for correlated signals such as speech, it is highly likely the channel in error would be determined, and possible corrected.

Assuming the signal is in the range 0–V volts and is divided into K segments, then the means square quantizing error is given as:

$$N_q = \sum_{j=1}^{K} \int_{v_j}^{v_{j+1}} (v - \bar{v}_j)^2 p(v) dv \quad (1)$$

where $\bar{v}_j$ is the midpoint between $v_j$ and $v_{j+1}$ and p(v) is the probability density function of the input signal. For p(v) constant within a step, j, $p(v) = p_j v_j \leq v < v_{j+1}$ and for step size $\Delta V$ $$N_q = \sum_{j=1}^{K} p_j(v - \bar{v}_j)^3/3 = \sum_{j=1}^{K} p_j \frac{\Delta V^3}{12}. \quad (2)$$

As noted in the Table of FIG. 3, any value for j appears a maximum of 5 possible times for each number of a number pair code, corresponding to slightly different values of the input signal, although the first and second numbers of the code are not identical. Assuming that the input voltage is uniformly distributed among all levels, then using equation (2), codes for the first and second numbers of a number pair alone having 3.1 and 1.9 times more quantizing noise than an ideal 3-bit coder, equivalent to a loss of 0.5 and 0.8 bits of resolution, respectively.

At a cost of resolution, this concept can be carried a step further by examining the number of pairs of the form (j±0,1,2; j±0,1,2); then ($9 \times 2^M - 20$) unique levels of resolution can be obtained. The penalty for doing this is increased quantizing noise on the split channels since in the case of a failed channel the decoded signal can be as many as two levels removed from that for a conventional quantizer with the same number of bits. However, for a total of six bits transmitted, about 5.7 bits of resolution are available and for 8 bits transmitted, nearly 7 bits of resolution result in the normal mode. A typical Table section for the $9 \times 2^M$ code would appear as

| 9×2^M LEVELS | 1ST NO. OF PAIR | 2ND NO. OF PAIR | CONVENTIONAL M-BIT CODER |
|---|---|---|---|
| . | j | j+1 | |
| . | j | j+2 | |
| . | j−1 | j+2 | |
| . | j+2 | j−2 | |
| . | j | j | j |
| . | j−2 | j+2 | |
| . | j+1 | j−2 | |
| . | j | j−2 | |
| . | j | j−1 | |

The section for the j+1 conventional code can be formed in a similar manner to that for the Table of FIG. 3 by adding the quantity "one" to each of the above values, with the remaining sections formed by adding the appropriate number to arrive at the overall Table.

In estimating the quantizing noise as before, then compared to an ideal 16 level quantizer, the first and second number value of the $9 \times 2^M$ Table introduce 5.6 and 10.4 times more noise, respectively, than an ideal 4 bit coder, i.e., the expected single channel performance of the first and second number codes being approximately equivalent to 2.8 and 2.3 bits of resolution, respectively.

Figure 5:
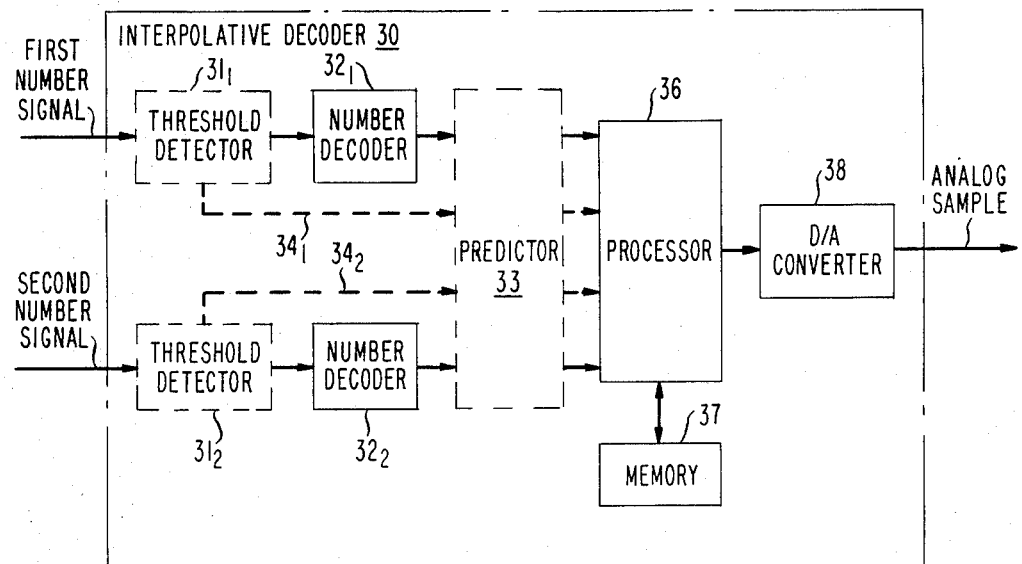
FIG. 5 is a block diagram of a decoder in accordance with the present invention including optional prediction equipment.

A typical interpolative decoder 30 in accordance with the present invention is shown in FIG. 5. There, decoder 30 receives the first and second number signals transmitted by a remote transmitter over separate leads or channels in optional threshold detectors $31_1$ and $31_2$, respectively. First and second threshold detectors $31_1$ and $31_2$, when present, function to both pass the associated first and second number signals to a first and second number decoder $32_1$ and $32_2$, respectively, and to detect whether the energy in the received associated number signal is above or below a predetermined threshold value and send such indication to either an optional predictor 33 or a processor 36 via lines $34_1$ and $34_2$. It is to be understood that first and second threshold detectors $31_1$ and $31_2$ could be replaced by a first and a second parity check circuit which function to detect if one or the other number signals is in error. First and second number decoders $32_1$ and $32_2$ function to determine the number received in the associated number signal and to pass such information to optional predictor 33 or directly to processor 36 in case predictor 33 is not used. Should the energy of the received number signal be detected as below the predetermined threshold level, then the number signal from the associated decoder 32 will not be used by predictor 33 or processor 36 since such indication means that an excessive error rate is being encountered which would make such number generally unreliable.

Processor 36 functions in an inverse manner to processor 16 of FIG. 2 by taking the two numbers of the received number pair signal and via, for example, a look-up table operation in an associated memory 37, transforms the number pair signal into an equivalent digital signal of an M-level code. If both numbers of a number pair code are properly received, then processor 36 should generate the same digital number as found at the output of A/D converter 14 in FIG. 2 with a high degree of resolution. However, if only one of the numbers of a number pair code is received correctly, then, without a predictor 33, processor 36 would perform a look-up operation and provide a digital signal which is the best estimate of the correct digital number with some reduction in resolution as was described hereinbefore in association with the Table of FIG. 3. The output digital signal from processor 36 is then converted by a digital-to-analog converter 38 into an equivalent analog signal sample which should correspond to the analog signal sample originally generated at the output of sampling means 10 of FIG. 1.

When an interpolative decoder 30 uses a predictor 33, the predictor generally functions to predict the most likely correct number pair signal of a plurality of possible number pair signals when both or only one of the first and second number signals is received correctly. Generally, the predictor 33 would provide better resolution than, for example, processor 36 just indicating the level, for example, in the center of the maximum excursion range possible in the Table for a correctly received number of a number pair, or the level where the correctly received number of a number pair is mostly found in the Table as might be performed by a majority logic decoder. Predictors typically function to store one or more of the most recent last-look correctly received number pairs in a sequence. With analog signals, the samples do not make extreme excursions from one sample to the next, and a last-look progression can be used by a predictor to determine which of a plurality of possible number pairs would most likely be the correct number pair and generate an output signal indicating such possibility.

Figure 6:
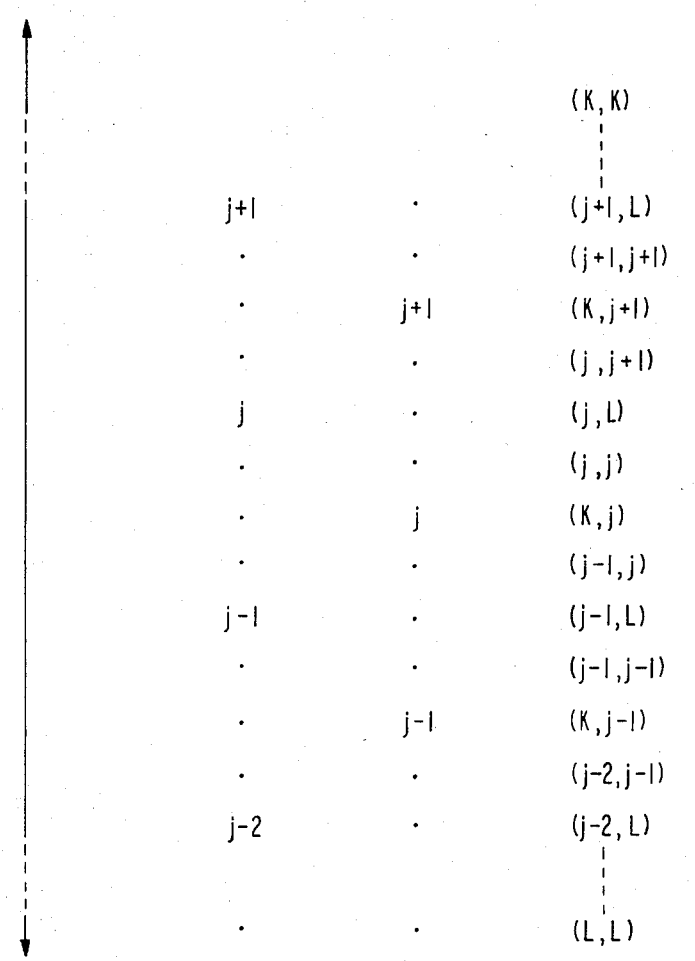
FIG. 6 is a table showing a typical code with $4(K-1)-1$ levels using two K-level split channels in accordance with the present invention for use with a predictor of FIG. 5.

In using a predictor 33 in an interpolative decoder 30, the same line of thinking can be followed as outlined hereinbefore and other techniques can also be incorporated where, for example, certain values are set aside to indicate an interpolation between major steps. Again unique number pairs are used to identify the quantizing steps. However, in this instance certain numbers are used as designators with special meaning. For example, let L represent all zeros and K all ones. Then the number pairs (K,j), (j,K), (L,j), (j,L) and (j,j) provide 5 quantizing levels, for each value of j. To illustrate the concept, consider a coder using the codes shown in the Table of FIG. 6. The K steps of the first and second numbers of a number pair are offset by half a level. The top level (K) for the first number of the number pair and the lowest level (L) for the second number of the number pair are special designators, so that the pair (K,j) and (j,K) always indicate a unique level. The pair (j−1,j) and (j,j) represent quantized levels equal to the average of the two numbers.

When M=3, this technique produces a total of 27 levels which is 4.8 bits of resolution for six transmitted bits. If a channel fails, then one-quarter of the time the decoder will receive the special word (all ones for the first number or all zeros for the second number of the number pair); thus it is necessary to predict what value had been transmitted by the remote transmitter and the included coder. The advantage of this code over the previous approach is that the resolution is higher when perfect transmission is obtained.

Another variation of this coding scheme is not with all one digits and all zero digits being used as special designators, but instead for a K level quantizer using the value $\bar{j}=j+K/2 \bmod K$. A simple code which produces 3K levels of resolution using this technique is illustrated in the Table of FIG. 7. There, if one of the channels fails, the value $\bar{j}$ is received one-third of the time on the average. For any received value, two outputs are possible; thus decoder 30 must choose between j and $\bar{j}$, where the incorrect output is one-half the entire voltage range removed from the true signal, which makes successful prediction easier.

In this example, it should be understood that the number pairs themselves are not unique since (j,j) becomes (j,j) K/2 quantizing steps later. This produces an ambiguity in decoding even when both channels are working. One way to avoid this at little penalty is to introduce a value slightly different than j̄ for one of the number codes of the number pairs as, for example, j′=j+K/2−1 and encode using the pairs (j,j̄), (j′,j) and (j,j′) all of which are unique.

It is to be understood that the above-described embodiments are simply illustrative of the principles of the invention. Various other modifications and changes may by made by those skilled in the art which will embody the principles of the invention and fall within the spirit and scope thereof. For example, the two methods described hereinbefore, one method using the number pairs (j,j±1) and the other method using special designators such as (j,L) or (j,j̄) can be combined to produce split channel codes which, in the single channel mode, require modest prediction while obtaining good quantizing accuracy. Additionally, such codes could comprise any number of interpolative steps for each step in the single channel mode.

What is claimed is:

1. An encoder capable of transmitting binary encoded output signals representative of samples of an analog input message signal to the encoder, the encoder comprising:

sampling means (10) responsive to an analog input message signal to the encoder for generating samples of the input message signal at a predetermined sampling rate; and encoding means (14, 16, 18) responsive to the samples from said sampling means for encoding each of the received samples into a unique digital number pair signal representative of a quantized version of each received sample, each number pair signal including a first and a second digital number signal comprising M bits each for transmission over a first and a second channel or path, respectively, where predetermined ones of the possible unique digital number pair signals which can be formed by said encoding means comprise different first and second digital number signals and each of the associated first and second digital number signals provide a capability for substantially reconstructing the associated analog input message signal sample at a remote decoder.

2. An encoder according to claim 1 wherein the encoding means comprises:

first encoding means (14) capable of encoding each analog signal sample from the sampling means into a representative signal of a $2^{2M}$ level code; and second encoding means (16, 18) capable of encoding each separate representative signal of the $2^{2M}$ level code into the representative unique digital number pair signal.

3. An encoder according to claim 1 or 2 wherein the encoding means is capable of generating a maximum of $Y \times 2^M - Z$ unique digital number pair signals to cover the possible excursion range of the analog samples from the sampling means, where Y and Z are integers.

4. An encoder according to claim 1 or 2 wherein predetermined ones of the possible M-bit numbers for each of the first and the second digital number signals are used as designators with a special meaning such that when K and L are such designators, the number pairs (K,j), (j,K), (L,j) (j,L) and (j,j) provide separate quantizing levels for each value of j.

5. An encoder according to claim 4 wherein the K steps of the first and second numbers of a number pair are offset by half a level and the top level K for the first number of the number pairs and the lowest level L for the second number of the number pairs are special designators so that the pairs (K,j) and (j,L) each indicate a unique level and the pairs (j−1, j) and (j,j) represent quantized levels equal to the average of the two numbers.

6. An encoder according to claim 2 wherein the second encoding means comprises a processing means including a memory for storing conversion tables to enable said processing means to convert said samples into representative digital number pair signals.

7. A decoder capable of decoding a digital split-channel signal comprising a first and a second number signal including M-bits each which forms a digital number pair signal, the first and second number signals being received over separate channels or paths and the number pair signal being a representation of a digitally encoded analog signal sample, the decoder comprising a number decoder ($32_1$, $32_2$) capable of determining each of the numbers received separately in the first and second number signals associated with each split-channel signal; and decoding means (36–38) capable of transforming each possible unique digital number pair signal into a unique analog signal sample, where predetermined ones of the possible digital number pair signals comprise first and second number signals of different values.

8. A decoder according to claim 7 wherein the decoder further comprises:

threshold detecting means capable of both detecting when the energy level in either one of the first and second number signals is below a predetermined threshold level and generating an output signal to the decoding means indicating which number signal has a low energy level.

9. A decoder according to claim 8 wherein the decoding means is responsive to either one of a signal from the threshold detecting means or the reception of an invalid number pair signal for predicting from a valid one of the first and second number signals the most-likely correct number pair signal for subsequent transformation into the proper analog signal sample.

10. A decoder according to claim 7 wherein the decoder further comprises:

parity checking means capable of detecting if either one of the first and second number signals is in error and generating an output signal to the decoding means indicating which number signal is in error.

11. A decoder according to claim 10 wherein the decoding means is responsive to either one of a signal from the parity checking means or the reception of an invalid number pair signal for predicting from a valid one of the first and second number signals the most-likely correct number pair signal for subsequent transformation into the proper analog signal sample.

* * * * *